UNITED STATES PATENT OFFICE.

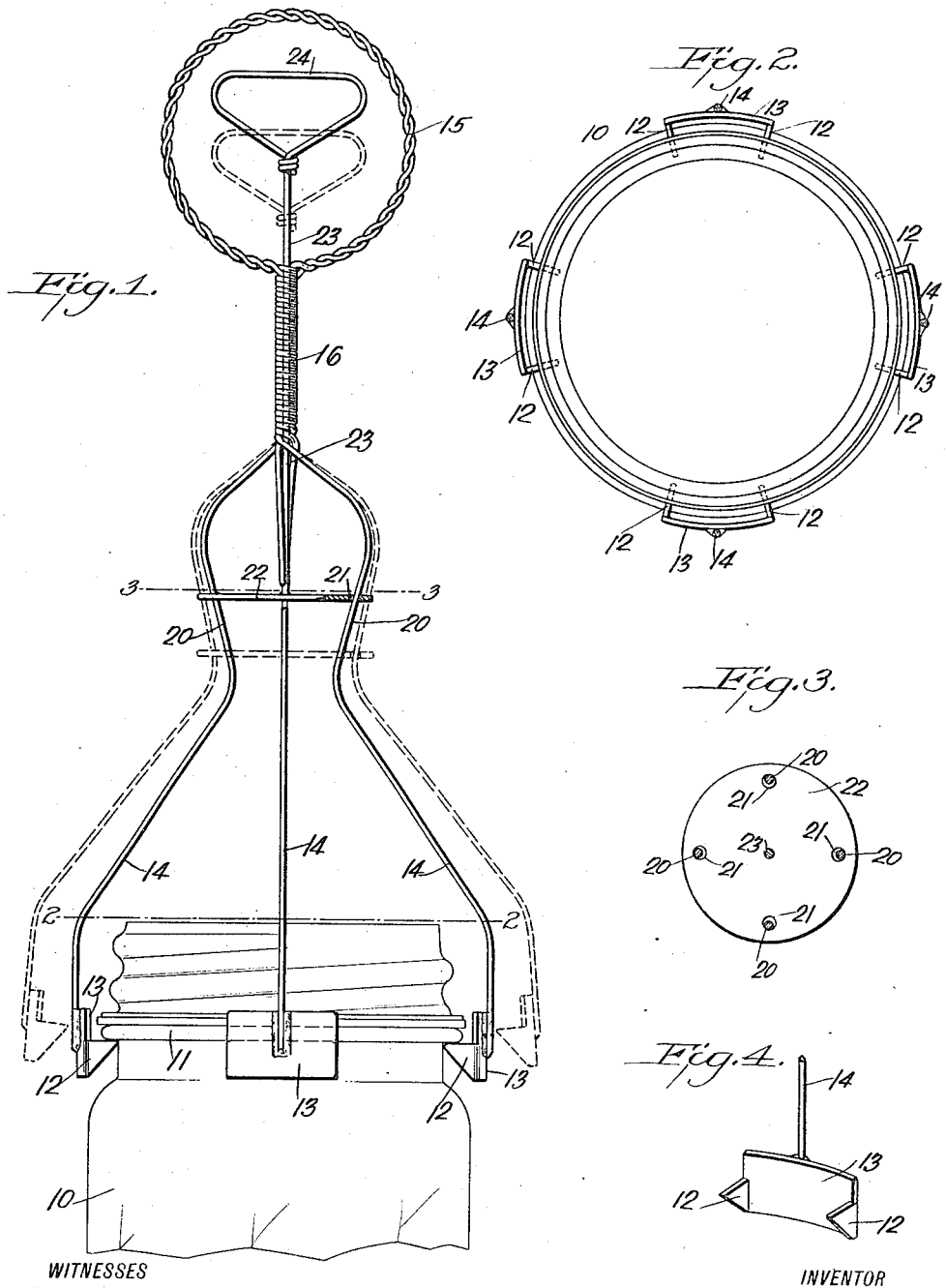

EUGÈNE C. BAECK, OF IRVINGTON, NEW YORK.

JAR-LIFTER.

1,283,034.   Specification of Letters Patent.   Patented Oct. 29, 1918.

Application filed April 2, 1918. Serial No. 226,245.

*To all whom it may concern:*

Be it known that I, EUGÈNE C. BAECK, a citizen of the United States, and a resident of Irvington-on-the-Hudson, in the county of Westchester and State of New York, have invented a new and Improved Jar-Lifter, of which the following is a full, clear, and exact description.

The object of the invention is to provide a new and improved lifter more especially designed for engagement with jars containing fruits, vegetables or like materials to be set in boiling water, and arranged to enable the user to readily place such jar into the vessel containing the hot water or remove it therefrom without danger of burning or scalding the hands. Another object is to enable the user to readily open or close the lifter for engagement with or disengagement from the jar, and to insure a firm grip on the jar. Another object is to provide a lifter which is simple and durable in construction and cheap to manufacture.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a side elevation of the jar lifter as applied and with one of the gripping arms broken out and a portion of the actuating slide shown in section;

Fig. 2 is a sectional plan view of the same on the line 2—2 of Fig. 1;

Fig. 3 is a similar view of the same on the line 3—3 of Fig. 1; and

Fig. 4 is a perspective view of one of the gripping members.

The jar 10 to be lifted is provided with the usual annular flange 11 adapted to be engaged at the under side by lugs 12 projecting inwardly from the ends of plates 13 attached to the lower ends of gripping arms 14. As shown in the drawings, four gripping arms 14 are employed and these gripping arms 14 are formed of two spring wires twisted together at their middle portions to form a ring or loop-shaped handle 15 which terminates in a hollow shank 16 produced by forming other portions of the two wires into a coil. The gripping arms 14 are the end portions of the two wires and extend from the lower end of the shank 16. The gripping arms are spaced equal distances apart and are provided near the upper ends with upwardly and outwardly inclined portions 20 which extend through apertures 21 formed in an actuating slide 22 in the form of a disk secured at its middle on the lower end of a shank 23 extending upwardly through the hollow shank 16. The upper end of the shank 23 terminates in a handle 24 arranged within the opening of the handle 15.

When the slide 22 is in lowermost position on the inclined portions 20 then the gripping arms 14 are spread apart, as plainly indicated in dotted lines in Fig. 1, to permit of passing the lower ends of the gripping arms over the upper end of the jar 10 until the gripping lugs 12 are immediately below the flange 11. The operator now pulls the handle 24 in an upward direction so that the slide 22 acting on the inclined portion 20 causes the gripping arms 14 to swing inwardly to engage the gripping lugs 12 with the under side of the flange 11, as plainly shown in full lines in Figs. 1 and 2. The operator maintains the hold on the handle 24 and on lifting the handle lifts the entire lifter and with it the jar 10 thus permitting the operator to readily transfer the jar from a table to a vessel containing the boiling water, or to lift the jar from the vessel back onto a table without danger of scalding the hands. It will be noticed that the heavier the jar the tighter the gripping arms 12 engage the jar owing to the suspension of the lifter by the handle 24, which latter causes the disk 22 to draw the inclined portions 20 toward each other thus moving the gripping arms 14 in a like direction for the purpose mentioned. When it is desired to disengage the lifter from the jar the operator also takes hold of the handle 15 and then bears down on the handle 24 to move the slide 22 downwardly thus swinging the gripping arms 14 in an outward direction thereby disengaging the gripping lugs 12 from the flange 11 of the jar 10.

From the foregoing it will be seen that the user can readily engage the jar lifter with the jar for carrying the latter about or disengage the lifter from the jar after the desired functions have been performed. It will further be noticed that the lifter is very simple and durable in construction and can be cheaply manufactured.

Having thus described my invention, I claim as new and desire to secure by Letters Patent:—

1. A jar lifter comprising a handle having a hollow shank depending therefrom, said shank comprising four wires coiled into tubular formation and spreading out as arms at the lower end of the tube in planes at right angles to each other then curved downwardly and inwardly, and then outwardly again, arcuate plates at the lower ends of the arms, inwardly projecting shelves at the side edges of the said plates, said shelves adapted to engage beneath the flange of a jar neck, a circular disk having apertures therethrough in pairs disposed in planes perpendicular to each other, the aforesaid arms passing through said apertures intermediate the two outwardly extending portions of the arms, a rod rigidly attached to the center of the disk and extending upwardly through the tubular shank and terminating in a handle within the first mentioned handle, and lying in substantially the same vertical plane as said handle.

2. A jar lifter, comprising a loop-shaped handle, a hollow shank and gripping arms made of four wires depending therefrom and having portions twisted together to form the said handle, other portions of the wires being formed into a coil to provide the said hollow shank, and the ends of the wires being spaced apart to form the said gripping arms, the latter having upwardly and outwardly inclined portions, the terminals of the gripping arms having shelved jaws adapted to engage beneath the neck flange of a jar, a disk having apertures through the same adjacent its periphery and through which extend the said inclined portions of the gripping arms, and a disk shank carrying the said slide and extending through the said hollow shank, the said slide shank terminating in a loop handle arranged within the opening of the said first named handle.

EUGÈNE C. BAECK.

Copies of this patent may be obtained for five cents each, by addressing the "Commissioner of Patents, Washington, D. C."